United States Patent [19]

Smith

[11] Patent Number: 5,341,230

[45] Date of Patent: Aug. 23, 1994

[54] WAVEGUIDE HOLOGRAPHIC TELLTALE DISPLAY

[75] Inventor: Ronald T. Smith, Torrance, Calif.

[73] Assignee: Hughes Aircraft Company, Los Angeles, Calif.

[21] Appl. No.: 995,251

[22] Filed: Dec. 22, 1992

[51] Int. Cl.$^5$ .................. G02B 5/30; G02B 5/32; G02B 27/28

[52] U.S. Cl. .................. 359/13; 359/14; 359/25; 359/34; 359/494

[58] Field of Search .............. 359/1, 13, 14, 15, 22, 359/25, 34, 494, 495; 340/479, 705

[56] References Cited

U.S. PATENT DOCUMENTS

| | | | |
|---|---|---|---|
| 4,709,613 | 12/1388 | Moss | 350/3.7 |
| 4,795,223 | 1/1989 | Moss | 350/3.75 |
| 4,966,426 | 10/1990 | Moss et al. | 359/15 |
| 4,973,132 | 11/1990 | McDonald et al. | 359/13 |
| 5,101,193 | 3/1992 | Smith et al. | 359/1 |
| 5,106,174 | 4/1992 | Smith | 359/15 |
| 5,138,470 | 8/1992 | Moss et al. | 359/13 |
| 5,196,951 | 3/1993 | Wreede | 359/15 |
| 5,243,449 | 9/1993 | Smith | 359/15 |

FOREIGN PATENT DOCUMENTS

| | | | |
|---|---|---|---|
| 0452815 | 10/1991 | European Pat. Off. | 340/749 |
| 2247613 | 10/1990 | Japan | 359/15 |

*Primary Examiner*—Martin Lerner
*Attorney, Agent, or Firm*—L. A. Alkov; W. K. Denson-Low

[57] ABSTRACT

A waveguide holographic telltale display for displaying images to a vehicle driver via the vehicle windshield. A light source injects light into the base of a clear inner windshield singlet. A mirror hologram between the inner and outer singlets confines a majority of the injected light to the inner singlet. An image hologram between the windshield singlets diffracts light out to the vehicle driver. A halfwave plate between the image hologram and the inner singlet reduces ghosting and allows the driver to view the images even through polarized sunglasses. IR light is blocked by a tinted outer singlet or a holographic solar coating. The display does not suffer from ambient turn from the sun, and the light source is hidden away from the vehicle dash.

37 Claims, 8 Drawing Sheets

WAVEGUIDE HOLOGRAPHIC TELLTALE DISPLAY

BACKGROUND OF THE INVENTION

This invention relates to holographic displays for projecting head-up images onto a vehicle windshield.

A floodlit holographic telltale display, as described in U.S. Pat. Nos. 4,790,613 and 4,795,223 is capable of producing a set of bright, uniform, multi-colored virtual images in the plane of the windshield. In U.S. Pat. No. 4,790,613 the holograms are illuminated by the output from optical fibers.

The holographic telltale display has two disadvantages. It suffers from ambient turn-on, which is caused by light from the sun passing through the telltale hologram, having 4% reflection off the lower windshield glass/air interface, and illuminating the telltale hologram which diffracts the light to the driver. In addition, objectionable virtual images of the light source or holes cut through the dashboard to pass the light to the windshield case can be reflected off the windshield.

Ideally, the car manufacturers want to make the dash featureless except for the uniform corrugated visual texture of the dashboard material. Putting holes in the dash for the light sources create a discontinuity in the veiling glare brightness pattern.

Therefore, it would be advantageous to provide a display which had all of the advantages of the floodlit telltale display but without the disadvantages described above.

SUMMARY OF THE INVENTION

A display in accordance with this invention includes a means for injecting light into the base of a clear windshield, a holographic mirror which confines the light to the bottom windshield singlet, an image hologram which diffracts light out to the driver, a halfwave plate to reduce the ghosting and allow polarized sunglasses to be used by the driver, and a means for blocking IR light from entering the car, such as a tinted upper windshield singlet, a dielectric solar coating or a holographic solar coating.

The unique combination of trapped beam technology with a halfwave film layer, a solar control hologram, a mirror hologram, and clear glass permits a previously unattainable display to be achieved. The display allows static holographic images to appear in the plane of the windshield, and provides the advantages of preventing ambient turn-on from the sun, and hiding the bulbs from view, away from the dash, to avoid annoying virtual images of the bulbs in the dash.

BRIEF DESCRIPTION OF THE DRAWING

These and other features and advantages of the present invention will become more apparent from the following detailed description of an exemplary embodiment thereof, as illustrated in the accompanying drawings, in which.

DETAILED DESCRIPTION OF THE PREFERRED EMBODIMENT

Figures 1, 2:
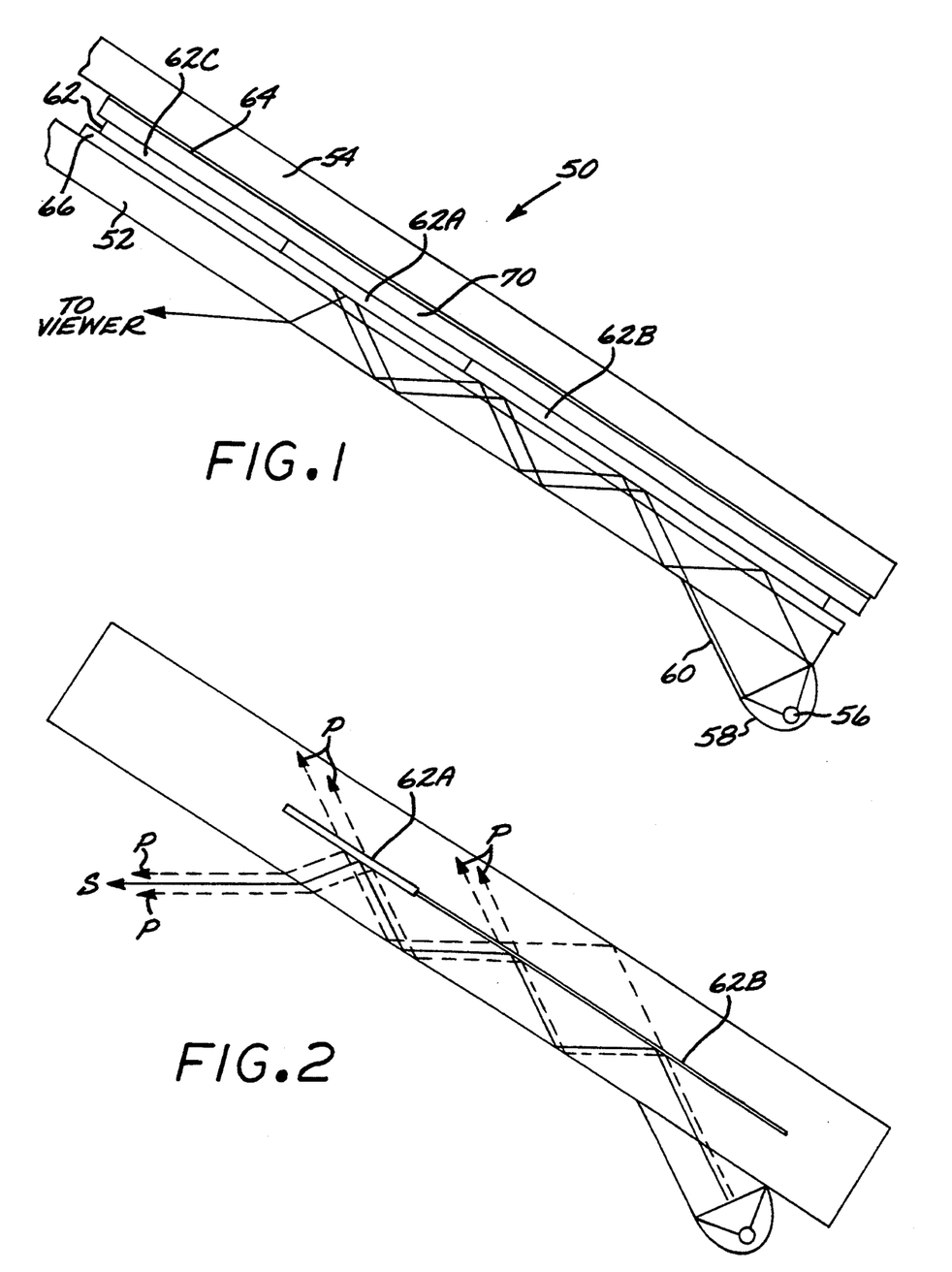
FIG. 1 illustrates a waveguide holographic telltale display embodying the invention.
FIG. 2 illustrates the path of light through the display system of FIG. 1, under the assumption there is no halfwave film installed therein.

The waveguide holographic telltale display 50 shown in FIG. 1 embodies the present invention. The windshield 50 comprises bottom and top windshield singlets 52 and 54, sandwiching the other elements, including a solar coating or holographic solar control film 64 adjacent the top singlet 54, which is preferably a tinted singlet. A layer of polyvinyl butyral (PVB) 70 is adjacent the film 64. A halfwave layer 66 is disposed adjacent the bottom singlet 52. A hologram 62 is in turn disposed next to the layer 66. The hologram 62 has several sections. Section 62A is the telltale hologram, providing a predetermined telltale image when illuminated by the light source 56. The telltale image conveys some predetermined message, such as a low fuel indication, a seatbelt warning, or the like. Section 62B is a mirror hologram. The hologram in section 62C can be a solar control reflection hologram, or an inert film which tapers from full-thickness adjacent to hologram 62A down to zero thickness one to two inches away from hologram 62A. This tapering is to avoid any abrupt discontinuities in thickness within the two singlets that will result in objectionable seethrough distortion. Hologram layer 62 can be made of one single piece of film, as described below; otherwise, sections 62A, 62B and 62C can be made separately.

The bottom windshield glass singlet 52 comprising the vehicle windshield is made of clear glass instead of the conventional tinted glass. The top glass singlet 54 can either be tinted or clear; however, if it is clear, then some other means for blocking IR light from entering the passenger cabin, such as a dielectric or holographic IR reflecting layer, will be employed in a typical application.

The light source 56 can be an incandescent bulb (halogen or non-halogen), a high-intensity discharge bulb, or the fiber optic output of a remotely-located incandescent or high-intensity discharge bulb. Light from the source 56 is collimated by a collimating lens, a parabolic reflector, or a non-imaging reflecting concentrator cavity. The use of a non-imaging reflector is described in commonly assigned, co-pending application Ser. No. 07/994,816, filed Dec. 22, 1992, entitled "Linear Lamp Holographic Trapped Beam CHMSL," by R. T. Smith and A. Daiber. This application is incorporated herein in its entirety by this reference. See also "The Optics of Non-imaging Concentrators," W. T.

Welford and R. Winston, Academic, New York, 1978, for more information on non-imaging concentrators.

Figure 8:
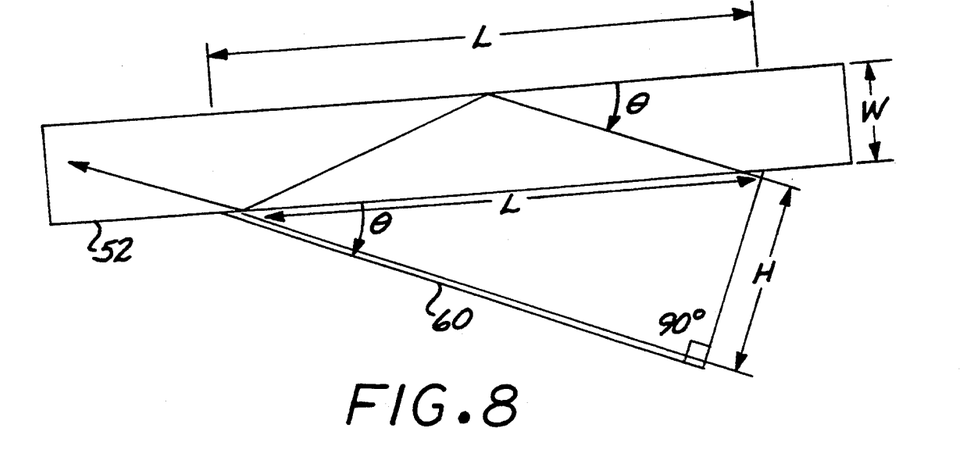
FIG. 8 illustrate the prism comprising the display of FIG. 1.

The collimated light is injected into the lower windshield singlet 52 by a wedged prism 60 attached to the lower singlet, or alternatively by a prismatic notch cut in the lower singlet, or by an input coupling hologram located directly above the lower singlet. FIG. 8 shows the prism 60 in further detail. The prism 60 is a right angle prism characterized by a length dimension L, a height dimension H and a prism angle $\Theta$. If the windshield inner singlet 52 has a thickness dimension W, the prism parameters are determined as follows:

$2W/L = \tan\Theta$ $2W/L = \sin\Theta$

Light from the light source 56 is trapped inside the windshield by total internal reflection from the air/glass interface for singlet 52. A majority of the internally trapped collimated light is confined within the clear lower glass singlet 52 by the photopolymer zero-degree reflection hologram 62B. This is mainly to avoid the light from being absorbed by the tinted upper singlet 54 and/or the dielectric/metal solar control film 64. The zero-degree reflection hologram 62B is a mirror reflection hologram whose fringes are parallel to the hologram surface. The reflection hologram 62B need not extend across the full width of the windshield, but rather need only extend across the lateral extent of the telltale hologram layer 62A between that layer and the light source.

The reflection hologram 62B is designed to reflect very efficiently (greater than 90%) the light incident on it at a highly off-axis angle, e.g., in this exemplary embodiment, 48 degrees. The hologram spectral bandwidth is tailored to cover the spectral range of the desired telltale image or the spectral bandwidth of the lamp, whichever is smaller. This reflection hologram 62B reflects very strongly over the wavelength range of the telltale hologram 62A for s-polarized light, but is not as effective a reflector for p-polarized light. Therefore, the s-polarized light will essentially be confined to the inner glass singlet 52 (assuming for the moment there is no halfwave film 66). However, the p-polarized light will partially transmit beyond the hologram 62, through the polyvinyl butyral (PVB) 70, and be reflected either by the dielectric or holographic solar control film 64 or the outer glass/air singlet back through the telltale and/or mirror hologram layer 62 into the lower singlet 52. In this manner, the p-polarized light is allowed to bounce back and forth on both sides of the hologram layer 62 as it propagates up the windshield glass. The s-polarized light is diffracted strongly by the telltale hologram 62A as seen in FIG. 2, which illustrates the path of light from the light source 56 through the system of FIG. 1, under the assumption there is no halfwave film 66 installed therein.

The foregoing configuration, assuming again there is no halfwave film 66, would cause two problems. First of all, the strongly diffracted s-polarized light from the telltale hologram 62A which is headed for the driver would reflect fairly strongly off the inner and outer glass/air interfaces (or solar control film 64), creating an objectionable ghost image. Secondly, since the telltale image arriving at the driver would be primarily s-polarized, when the driver puts on his s-polarized sunglasses, the telltale image will be virtually extinguished.

These problems are partially solved by placing the polyvinyl alcohol (PVA) halfwave film layer 66 between the inner glass singlet 52 and the telltale/mirror hologram layer 62.

Figure 3A:
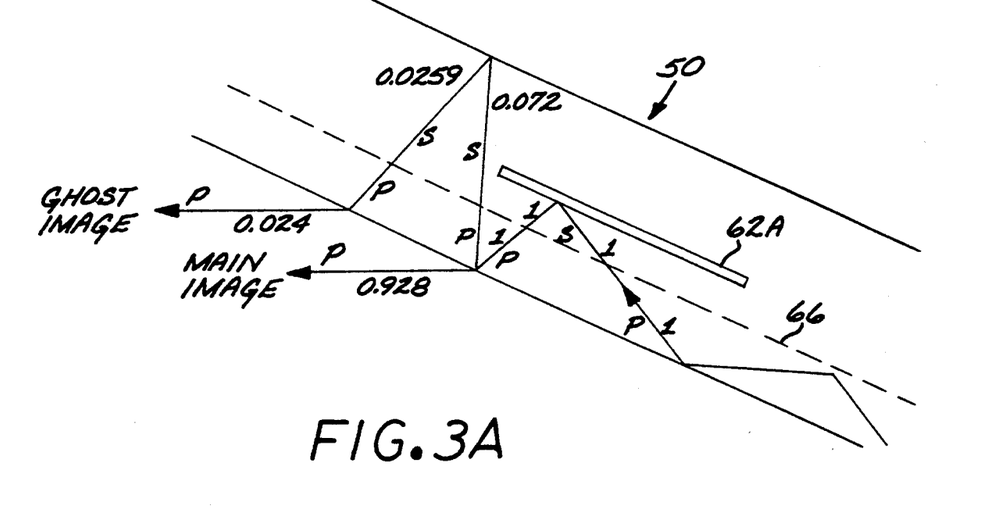
FIGS. 3A and 3B illustrate the main and ghost image relationship for p- and s-polarized light, respectively, through the system of FIG. 1 (halfwave layer).
Figure 3B:
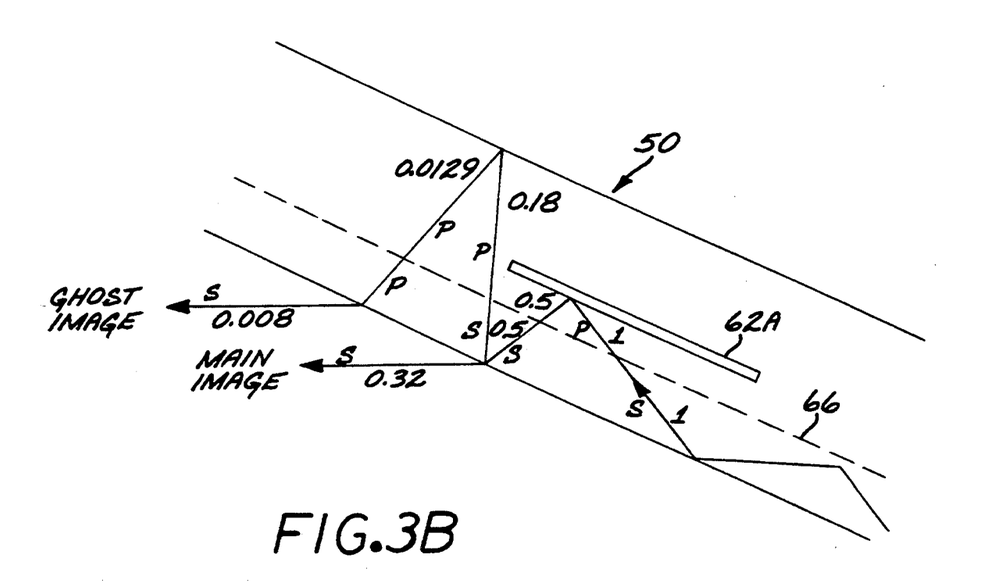

Referring now to FIGS. 3A and 3B, and starting at the point where the light is injected into the lower singlet 52, the p-polarized light incident on the halfwave layer 66 is flipped to s-polarization, is reflected strongly by the mirror hologram 62B, and is flipped back to p-polarized light as it passes back through the halfwave layer 66 into the lower singlet 52. The s-polarized light (FIG. 3B) entering the lower singlet 52 gets flipped to p-polarized light as it passes through the halfwave layer 66, and partially transmits through the telltale hologram layer 62A, where it reflects off the solar control film 64 and/or the outer glass/air interface and passes back through the hologram 62 and halfwave 66 layers where it re-enters the lower singlet 52 as s-polarized light again. S-polarized light incident on the telltale hologram 62A gets diffracted strongly toward the driver, but is flipped to p-polarization as it passes through the halfwave layer 66. The p-polarized light reflects weakly off the inner glass/air singlet. The weakly reflected p-light gets flipped back to s-polarization before reflecting fairly strongly off the outer glass/air interface and to the driver. The net effect is to reduce the ghost image brightness. Therefore, the result is a bright p-polarized image at the driver with a very weak p-polarized ghost image (FIG. 3A).

The p-polarized light incident on the hologram 62A from the bottom is diffracted weakly by the hologram 62A, gets flipped back to s, reflects fairly strongly off the inner glass 52/air interface, gets flipped back to p-polarization, reflects weakly off the outer glass/air interface, gets flipped back to s-polarization, and finally reaches the driver. The result is a weak s-polarized image with a much weaker ghost image (FIG. 3B).

The halfwave film layer 66 is only a partial solution because even an ideal halfwave layer will rotate the s-polarized light totally to p-polarized light from one incident angle and one wavelength only. For a range of wavelengths, such as are generated by the light sources referred to above, the majority of light will be rotated to p but it will not be 100%. Therefore, there will be some residual s-polarized light to cause ghosting and reduced brightness with polarized sunglasses. Furthermore, the lamp light incident on the halfwave layer covers a range of angles, not just one. Finally there may uncertainties in the production fabrication of these halfwave layers that will cause their retardance to deviate from a perfect halfwave.

The exact wavelength at which the halfwave film layer 66 is designed will depend on what lamp is used. If it is an incandescent bulb, the limiting bandwidth is the telltale bandwidth. If a telltale image covers 600–630 nm, then the midband wavelength would be at 615 nm, and this is the wavelength for which the halfwave layer will be designed. If an LED source with a peak brightness at 660 nm is used as the light source 56, then the halfwave layer's midband wavelength is at 660 nm.

FIGS. 3A, 3B, 4A and 4B and Tables 1 and 2 show a comparison in image brightness results, respectively including, and not including a halfwave layer for the example of light incident on the windshield at 72.8° in air and a telltale hologram 62A which diffracts 100% of s-polarized light and 50% of p-polarized light. Clearly the halfwave layer improves the situation. It even slightly improves the image brightness.

TABLE 1

|  | s-polarization | p-polarization | average pol |
|---|---|---|---|
| Main Image | 0.928 | 0.32 | 1.248 |
| Ghost Image | 0.024 | 0.008 | 0.032 |
| Main/ghost ratio | 38.7 | 40 | 39 |

TABLE 2

|  | s-polarization | p-polarization | average pol |
|---|---|---|---|
| Main Image | 0.64 | 0.464 | 1.104 |
| Ghost Image | 0.083 | 0.0024 | 0.0854 |
| Main/ghost ratio | 7.71 | 193.3 | 12.9 |

The p-polarized light that is incident on the telltale hologram 62A from its top side (adjacent the outer singlet 54) is weakly diffracted by the hologram, is weakly reflected off the upper glass/air interface, is flipped back to s-polarization, and arrives at the driver as an extra ghost image. For the example of FIGS. 4A and 4B, if the value of light incident on the hologram from the top side is one, then the value of light reaching the driver is 0.023. This is a non-negligible ghost image. However, by the time the p-polarized light reaches the top surface of the telltale 62A it has been appreciably attenuated by the tinted upper singlet 54 and/or the solar control film 64 and the PVB 70. Therefore, there is no need for a polarizer in the light source 56 lamp to eliminate this component.

Figure 9:
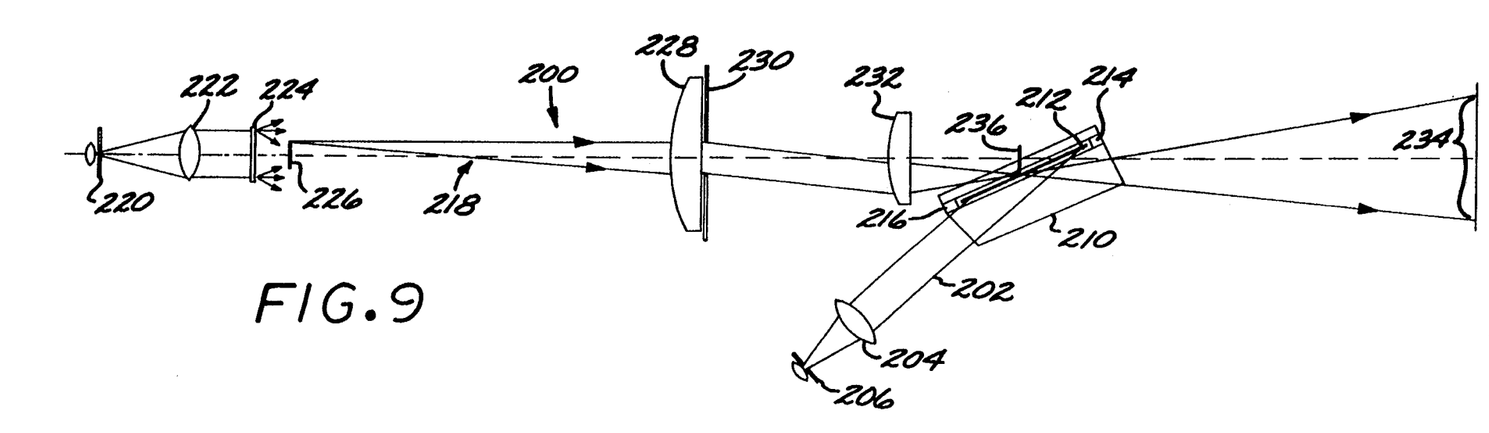
FIGS. 9–12 illustrate an exposure system for exposing the telltale hologram of the display of FIG. 1.

FIG. 9 is a top view of a telltale hologram exposure system 200 suitable for fabricating the telltale hologram 62A. The collimated reference beam 202 illuminates the film plate 208 (illustrated in FIG. 12), and is provided via a collimating lens 204 and spatial filter 206. The reference beam illuminates the holographic film layer 212 through a prism liquid gate comprising prism 210. The hologram film 212 is mounted on plate 208 which is immersed in an index matching liquid 214 within layer 216. The object beam 210 is provided via a spatial filter 220, a focusing lens 222, a high gain diffusing screen 224, an image reticle 226, and plano-convex spherical lenses 228 and 232. The focusing lens 222 takes the spherically diverging wave from the spatial filter 220 and focuses it to a point at the center of the aperture mask 230, i.e., if the high gain screen is not present. This ensures that maximum illumination is arriving at the eyebox 234. The high gain screen 224 diffuses the light, and the image reticle 226 is a transparency mask with clear openings and opaque areas that define a telltale image. The diffuse light from the screen that exits this reticle mask 226 is focused by the two lenses 228 and 232 so that an image of the reticle mask bisects the film 212 plane. An aperture mask 230 is placed on the exiting face of the first lens 228, and defines the size of the eyebox 234. The outline of the aperture mask 230 is focused by the second lens 232 through the film plate to a point in space far away from the film plate (thirty inches or more), where the image of the aperture mask is located. This image defines the eyebox for the playback of the hologram.

Figure 10:
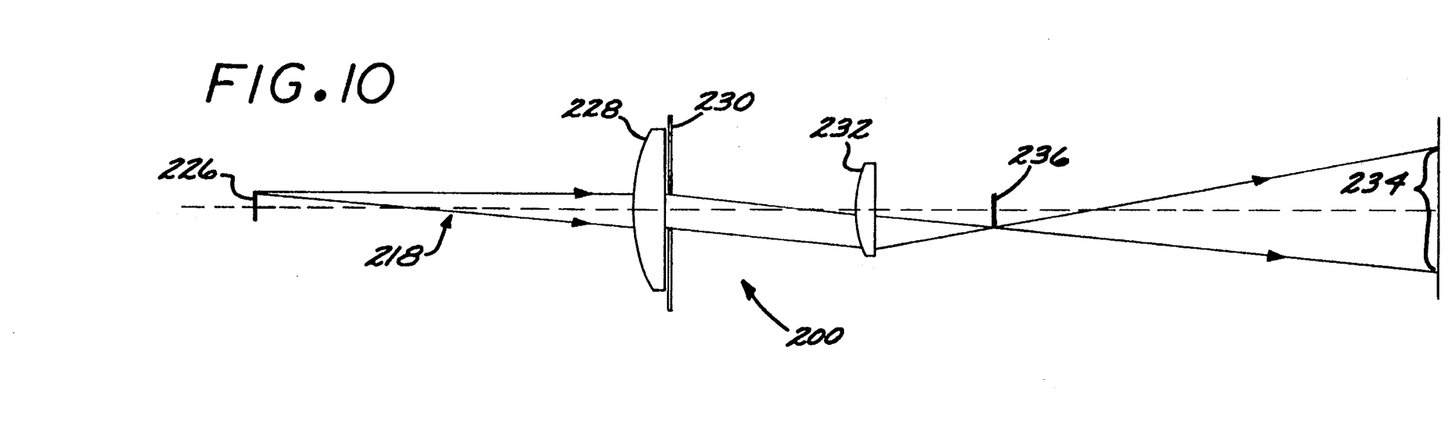
Figure 11:
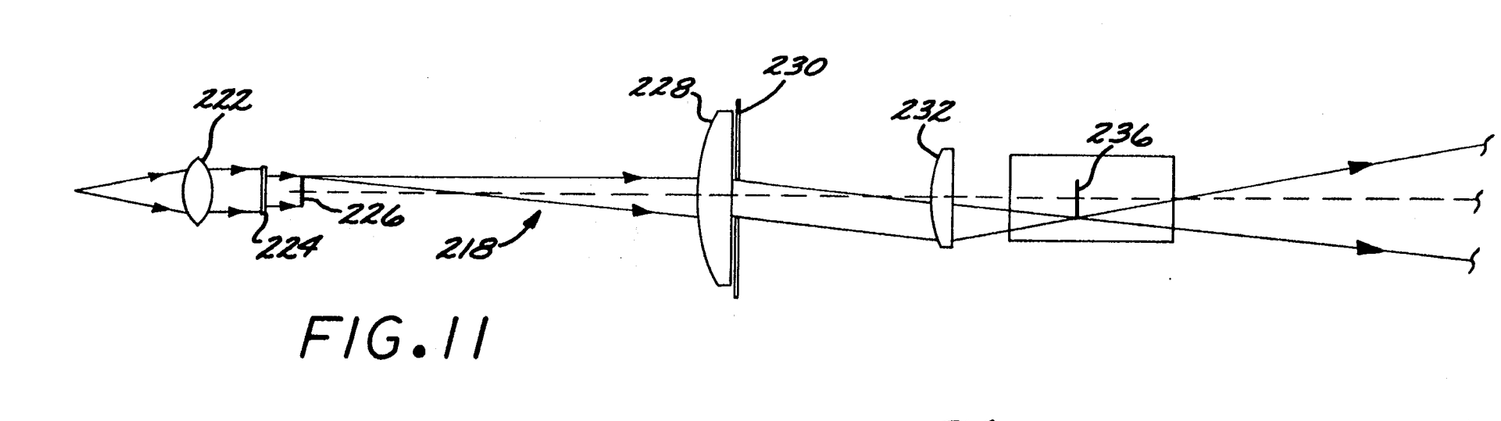
Figure 12:
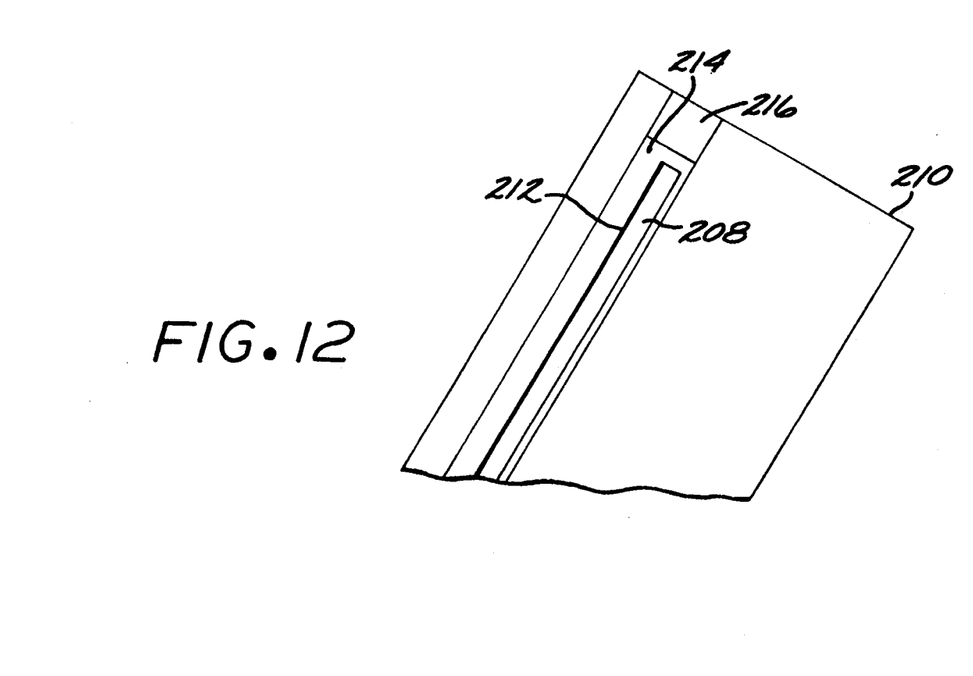

FIG. 10 is a side view of the exposure system 200 of FIG. 9. FIG. 11 is an expanded side view of a portion of the exposure system of FIG. 10. FIG. 12 shows an expanded view of the prism 210 and film plate 208.

The object beam 218 creates an evenly illuminated image 236 that bisects the hologram film plane which can be seen from a well-defined eyebox 234 behind the hologram. When this hologram is played back in reverse in the system of FIG. 1, the light is diffracted by the telltale hologram 62A so that a viewer located inside a well-defined eyebox in the driver's head area sees a vertical telltale image 236 bisecting the plane of the windshield. Outside of the hologram's eyebox the driver sees nothing.

Dielectric/metal solar control coatings of windshields suitable for the film 64 are made by Libbey Owens Ford (LOF) and others. One exemplary LOF coating is marketed as the "EZ-Kool" brand of solar control glass, LOF Automotive Center, 35715 Stanley Drive, Sterling Heights, Mich. 48312.

The mirror hologram 62B is exposed merely by roll-laminating a piece of photopolymer film onto a metal mirror (the film has some self-adhesion) and illuminating the film/mirror with a collimated laser beam incident at the angle which will yield the correct peak wavelength for playback.

Figure 5:
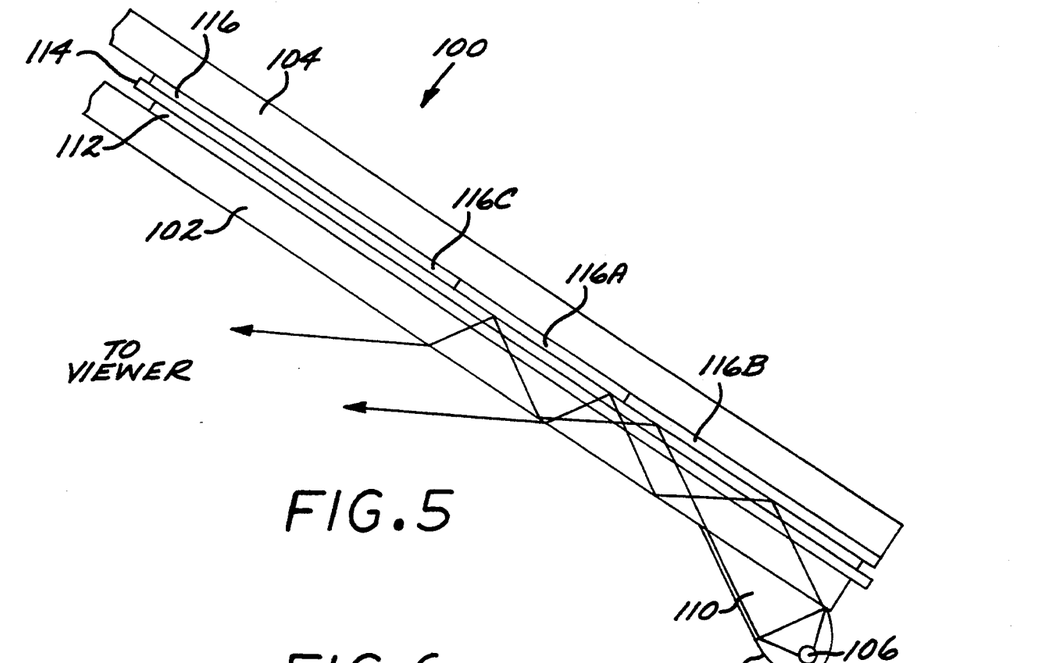
FIG. 5 illustrates an alternative embodiment of a waveguide holographic telltale display embodying this invention.

A layer of PVA may need to be placed between the hologram layer and PVB to avoid plasticizers from the PVB from entering the hologram layer 62 and causing undesirable peak wavelength and spectral bandwidth changes. It makes sense that the halfwave PVA layer 66 below the hologram layer 62 should also serve as the barrier layer between the hologram 62 and the PVB 70. Therefore, it might be advantageous to place the hologram layer 62 next to the underside of the upper glass singlet 54. However, it may be difficult to bond the hologram layer 62 directly to a dielectric solar control coating 64 on the underside of the singlet 54. A preferred alternative approach is to use a broadband IR reflective photopolymer holographic mirror to reject IR light instead of the dielectric coating, as shown in FIG. 5. The display 100 of FIG. 5 comprises the inner and outer windshield singlets 102 and 104, with the outer singlet 104 comprising tinted glass, and the inner singlet 102 of clear glass. Light from the light source 106 is collimated by reflector 108 and fed into the inner singlet 102 by prism 110, as in the embodiment of FIG. 1. A halfwave PVA layer 114 is disposed between the hologram layer 116 and the PVB layer 112 disposed adjacent the inner singlet 102. In FIG. 5, the mirror hologram 116B, telltale hologram 116A, and holographic solar control mirror hologram 116C are all incorporated in one single hologram 116 layer which is attached to the inner surface of the outer glass singlet 104 by any one of a variety of adhesives and/or primers.

Each hologram comprising layer 116 can be fabricated by contact printing, i.e., roll-laminating the hologram film against a rigid hologram master and illuminating with a collimated laser beam. The laser beam passes through the film, reflectively diffracts off the master and back onto the film to create the replicated hologram. In the case of the mirror reflection hologram and the solar control hologram, the master plate is a zero-degree mirror hologram, or else it can be replaced by a simple aluminum mirror. In the case of the telltale hologram, the master plate incorporates the telltale holograms in it. The holographic film is threaded onto a replication system that has three contact-copy exposure modules, one for each hologram type. Once the film passes through the three exposure modules, it is UV cured and rolled onto an output spool. As an option, the roll of exposed film can be oven heated to enhance the hologram efficiency.

Figure 6:
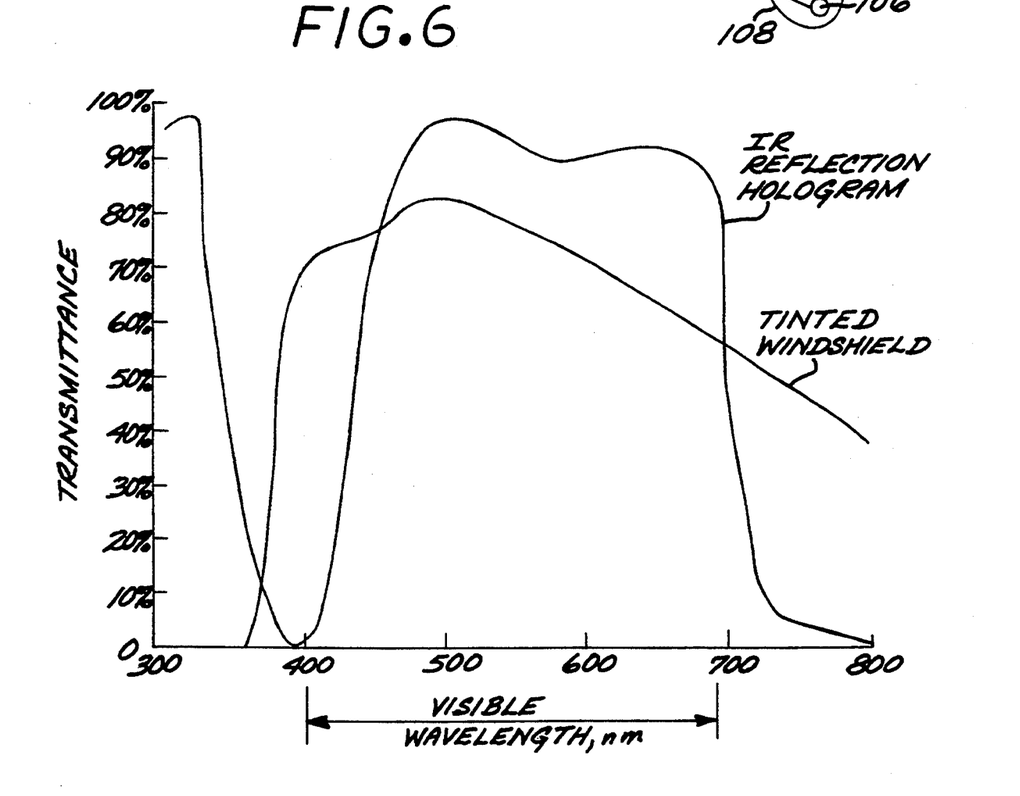
FIG. 6 is a transmittance profile of an IR-reflective solar control mirror hologram compared to that of conventional tinted glass.

FIG. 6 is a graph illustrating a typical type of performance achievable with a solar control IR reflection hologram of FIG. 5, as used in the embodiment and its advantages over a tinted windshield. As an added benefit the outer glass singlet can be made tinted if desired to increase the blockage of IR light.

Figure 7:
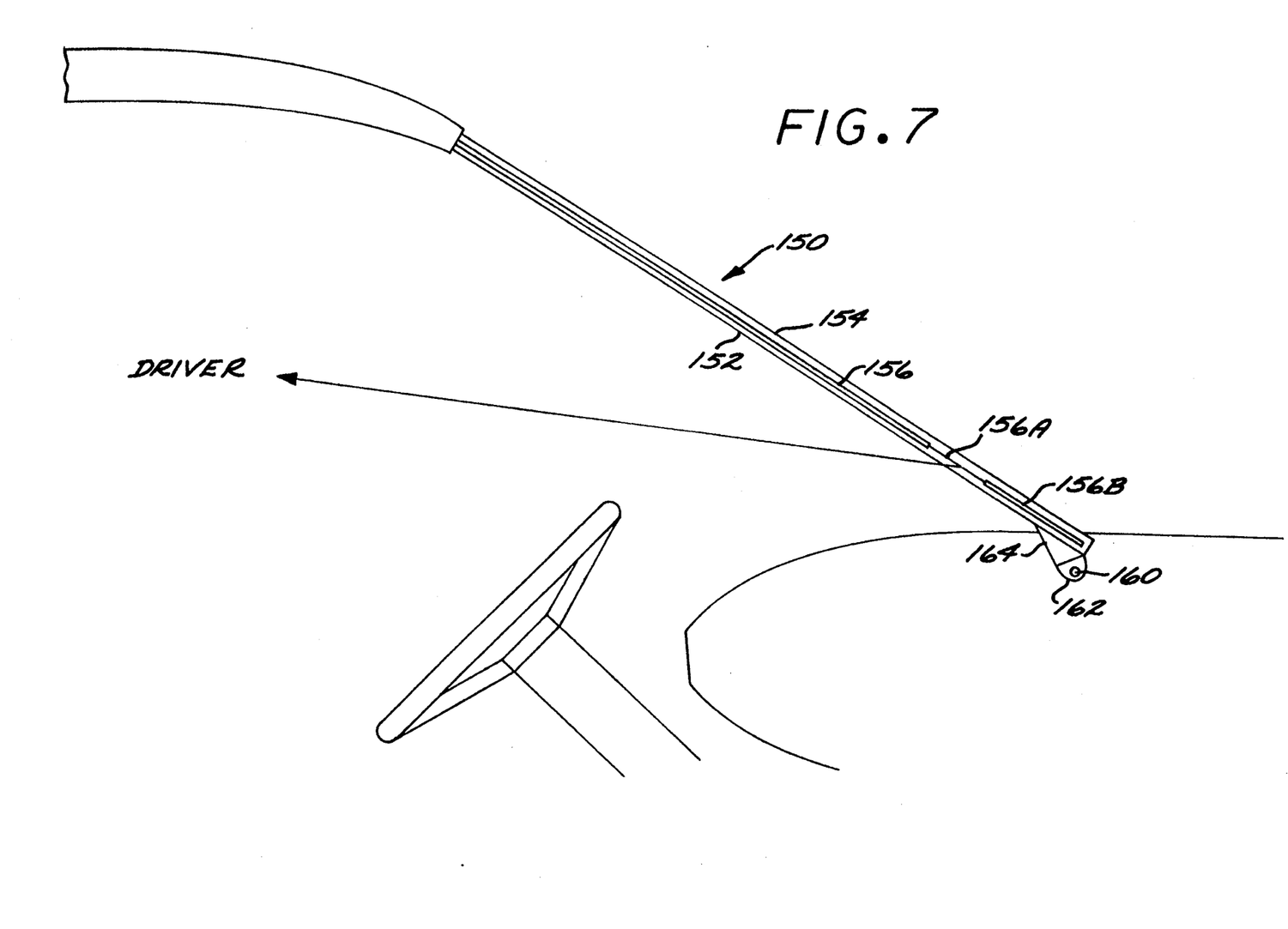
FIG. 7 illustrates a waveguide holographic telltale display installed in a vehicle in accordance with this invention.

A cross-sectional view of the system mounted in a vehicle is shown in FIG. 7. The windshield 150 includes inner and outer singlets 152 and 154. A hologram layer 156 disposed between the singlets comprises a mirror hologram 156B except in the vicinity of the telltale holograms 156A. A light source 160, reflector 162 and prism 164 provide a means for injecting light into the windshield singlet 152.

Figure 4A:
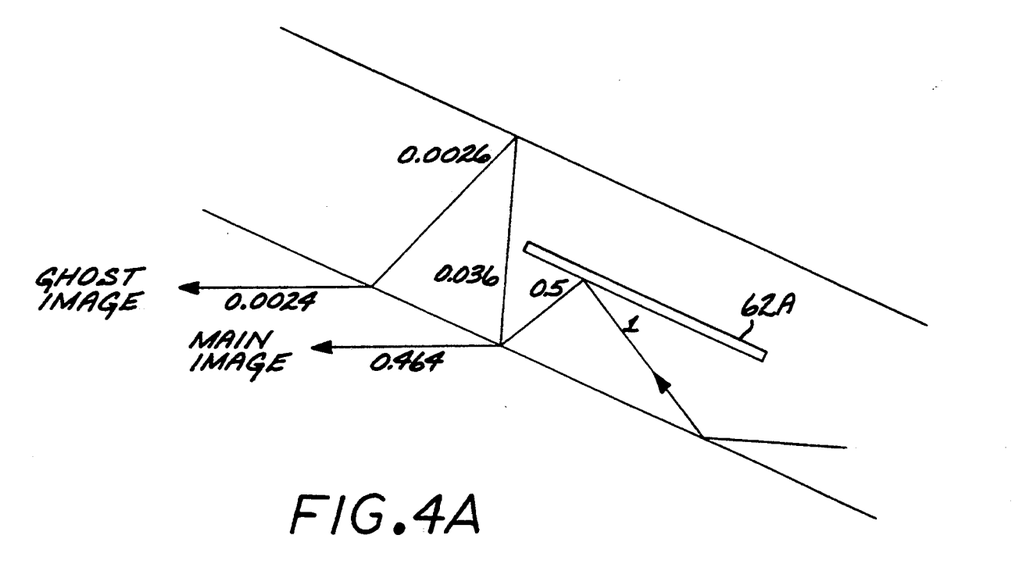
FIGS. 4A and 4B illustrate the main and ghost image relationship for p- and s-polarized light, respectively, through the system of FIG. 1 excluding the halfwave layer.
Figure 4B:
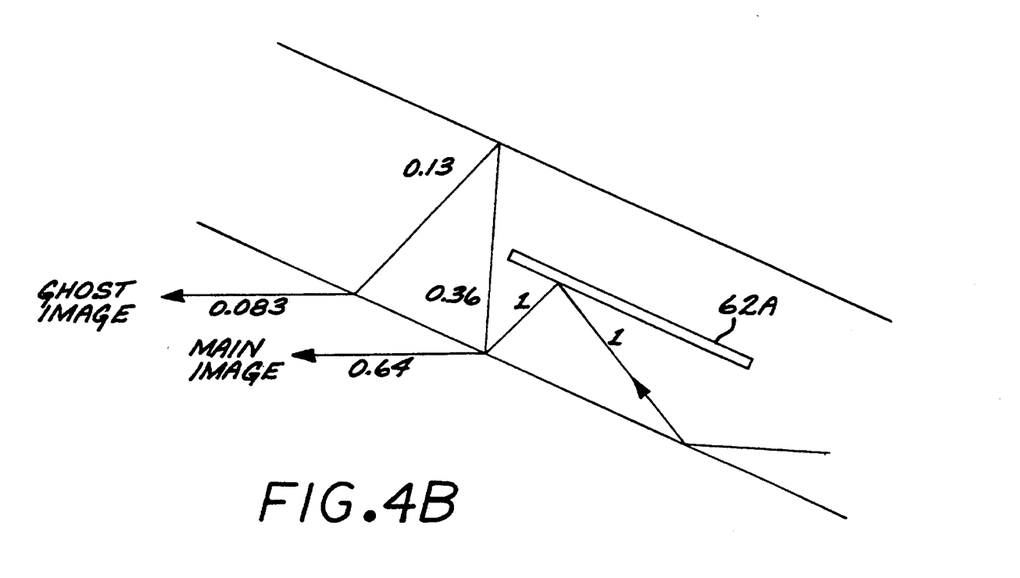

If one desires the road glare to arrive at the driver in s-polarization instead of in p-polarization, then an additional halfwave layer would need to be placed between the hologram layer and the inner surface of the outer singlet. Normally road glare is s-polarized; therefore, polarized sunglasses are designed to absorb s and pass p. If a halfwave layer in the windshield causes the road glare to be flipped to p-polarization, it will pass through the polarized sunglasses virtually unattenuated. Therefore, an additional halfwave layer could flip the polarization sense back to p-polarized light. This layer would also serve to modify the ghost image brightnesses as shown in Table 3 for the example of FIG. 4.

TABLE 3

|  | s-polarization | p-polarization | average pol |
|---|---|---|---|
| Main Image | 0.32 | 0.928 | 1.248 |
| Ghost Image | 0.0415 | 0.0048 | 0.0463 |
| Main/ghost ratio | 7.71 | 193.3 | 27 |

In either case, the thickness of the halfwave layer or layers can be gradually tapered down to zero outside of the hologram area to avoid any appreciable see-through distortion when looking through the windshield from the driver's vantage point.

Figure 13:
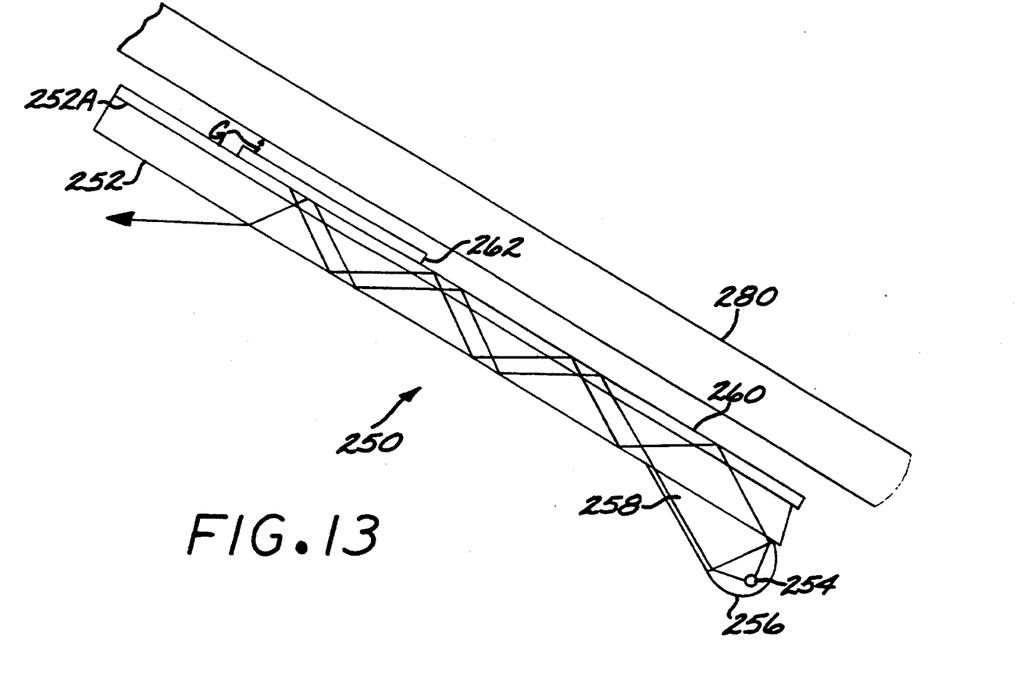
FIG. 13 illustrates an alternative embodiment of a waveguide telltale hologram embodying invention.

Another embodiment of the invention is shown in FIG. 13. In this case the layer 252 in which the light propagates toward the telltale hologram is physically separated from the windshield by an air gap G. In this case, once the light is injected into this layer 252, it propagates up the layer by total internal reflection, and does not need a mirror reflection hologram to confine it. This greatly simplifies the design for customers who do not mind a physically separated layer from the windshield.

FIG. 13 shows the waveguide telltale hologram assembly 250, separated by the air gap G from the inside surface of the conventional windshield 280. The assembly 250 thus comprises a plastic light guide 252, into which collimated light is injected from a light source 254, reflector 256 and plastic prism 258, in a manner similar to the light source arrangement of FIG. 1. The halfwave layer 260 is disposed on the surface 252A of the light guide facing the windshield 280. The telltale hologram 262 is in turn disposed on the exterior surface of the halfwave layer 260, between the air gap and the halfwave layer. As shown in FIG. 13, light from the light source propagates up the light guide by total internal reflection, until it reaches the telltale hologram and is diffracted from the hologram toward the viewer. The assembly could be secured in the position shown by various convention means, e.g., by use of spacers and adhesives.

It is understood that the above-described embodiments are merely illustrative of the possible specific embodiments which may represent principles of the present invention. For example, some applications may not require the half-wave plate, and in this case the half-wave plate may be omitted, thereby providing a simpler and cheaper display. Other arrangements may readily be devised in accordance with these principles by those skilled in the art without departing from the scope and spirit of the invention.

What is claimed is:

1. A waveguide holographic telltale display for projecting images via a vehicle windshield comprising inner and outer windshield singlets, comprising:
   means for injecting light into the base of said inner windshield singlet;
   a telltale image hologram disposed at a predetermined area between said singlets for diffracting light injected into said inner singlet out toward the vehicle driver; and
   a holographic mirror disposed between said inner and outer singlets for confining said injected light from entering said outer singlet, and wherein said holographic mirror does not extend over said predetermined area.

2. The display of claim 1 further comprising means for blocking infrared light from entering said vehicle through said windshield.

3. The display of claim 2 wherein said infrared blocking means comprises tinting means for tinting said outer singlet.

4. The display of claim 2 wherein said infrared blocking means comprises a dielectric solar coating applied between said outer and inner singlets.

5. The display of claim 1 wherein said means for injecting light into said singlet base comprises a light source and a light collimating means for collimating the light from said source.

6. The display of claim 5 wherein said means for injecting light into said singlet base further comprises a wedged prism attached to lower singlet base for directing said collimated light into said base.

7. The display of claim 1 wherein said holographic mirror comprises a photopolymer zero-degree reflection hologram.

8. The display of claim 1 further comprising a polyvinyl butyral (PVB) layer disposed between said singlets, and wherein said halfwave plate comprises a polyvinyl alcohol halfwave film disposed between said PVB layer and said holographic mirror and image hologram.

9. The display of claim 1 wherein said holographic mirror and said telltale image hologram are fabricated within a single hologram layer.

10. A waveguide holographic telltale display for projecting images via a vehicle windshield comprising inner and outer windshield singlets, comprising:
   means for injecting light into the base of said inner windshield singlet;
   a telltale image hologram disposed at a predetermined area between said singlets for diffracting light injected into said inner singlet out toward the vehicle driver;
   a holographic mirror disposed between said inner and outer singlets for confining said injected light from entering said outer singlet, and wherein said holographic mirror does not extend over said predetermined area; and a halfwave plate disposed between said hologram and said inner singlet for reduction of ghost telltale images.

11. The display of claim 10 further comprising means for blocking infrared light from entering said vehicle through said windshield.

12. The display of claim 11 wherein said infrared blocking means comprises tinting means for tinting said outer singlet.

13. The display of claim 11 wherein said infrared blocking means comprises a dielectric solar coating applied between said outer and inner singlets.

14. The display of claim 10 wherein said means for injecting light into said singlet base comprises a light source and a light collimating means for collimating the light from said source.

15. The display of claim 14 wherein said means for injecting light into said singlet base further comprises a wedged prism attached to lower singlet base for directing said collimated light into said base.

16. The display of claim 10 wherein said holographic mirror comprises a photopolymer zero-degree reflection hologram.

17. The display of claim 10 wherein said halfwave plate comprises a polyvinyl alcohol halfwave film.

18. The display of claim 10 further comprising a PVB layer disposed between said singlets, and wherein said halfwave plate comprises a polyvinyl alcohol halfwave film disposed between said PVB layer and said holographic mirror and image hologram.

19. The display of claim 10 wherein said holographic mirror and said telltale image hologram are fabricated within a single hologram layer.

20. A waveguide holographic display, comprising:
a vehicle windshield comprising a clear inner singlet and an outer singlet;
means for injecting light into said inner singlet;
an image hologram disposed at a predetermined display area between said singlets for diffracting light injected into said inner singlet toward a vehicle occupant to form an image;
holographic mirror means disposed between said inner and outer singlets between said light injecting means and said display area for confining said light from entering said outer singlet, wherein light travels within said inner singlet by total internal reflection from said light injecting means to said display area; and
a halfwave layer disposed between said image hologram and said inner singlet for reduction of ghost images.

21. The display of claim 20 further comprising means for blocking infrared light from entering said vehicle through said windshield.

22. The display of claim 21 wherein said infrared blocking means comprises tinting means for tinting said outer singlet.

23. The display of claim 21 wherein said infrared blocking means comprises a dielectric reflective solar coating applied between said outer and inner singlets.

24. The display of claim 21 wherein said infrared blocking means comprises a infrared reflective hologram layer disposed between said singlets.

25. The display of claim 20 wherein said means for injecting light into said singlet comprises a light source and a light collecting means for directing the light from said source toward said singlet.

26. The display of claim 25 wherein said light collecting means further comprises a wedged prism attached to a base of said inner singlet for directing said collected light into said base.

27. The display of claim 25 wherein said light source comprises an incandescent lamp.

28. The display of claim 20 wherein said image hologram comprises a photopolymer zero-degree reflection hologram layer.

29. The display of 28 further comprising a polyvinyl butyral (PVB) layer disposed between said halfwave layer and said image hologram.

30. The display of claim 20 wherein said halfwave layer comprises a polyvinyl alcohol halfwave film.

31. The display of claim 20 wherein said holographic mirror and said image hologram are fabricated within a single hologram layer.

32. The display of claim 20 further comprising an infrared reflective solar control hologram means disposed between said singlets outside said image region, and wherein said infrared reflective hologram means, said image hologram and said mirror hologram are fabricated as a single hologram layer.

33. The display of claim 20 wherein said image comprises a telltale image indicative of vehicle status information.

34. A waveguide holographic display, comprising:
a transparent light waveguide for transmitting light by total internal reflection along the interior of said waveguide from a light input area to an image area, said waveguide having opposed first and second surfaces for creating opposed air/waveguide interfaces which are capable of totally reflecting light incident on said interfaces from within said waveguide;
a light source for injecting light into said waveguide at said light input area, wherein said injected light propagates along the interior of said waveguide from said input area to said image area;
an image hologram disposed against said first waveguide surface at said image area for diffracting light injected into said waveguide toward said second surface at angles to permit said diffracted light to transmit through said second surface and out of said waveguide; and
a halfwave layer disposed adjacent said second surface at said image area for reduction of ghost images.

35. The display of claim 34 wherein said waveguide first surface is disposed adjacent the inner surface of a vehicle windshield, with an air gap between said inner surface and said first surface.

36. The display of claim 34 wherein said light source comprises an incandescent lamp, a reflector and a wedged prism attached to said waveguide at said input area for directing light generated by said lamp into said waveguide.

37. The display of claim 34 wherein said waveguide comprises a transparent plastic waveguide member.

* * * * *